United States Patent
Wang et al.

(10) Patent No.: US 6,703,111 B2
(45) Date of Patent: Mar. 9, 2004

(54) LASER THERMAL IMAGING PROCESS, DYE, AND ELEMENT

(75) Inventors: Ruizheng Wang, Rochester, NY (US); Kevin W. Williams, Rochester, NY (US); Ann L. Carroll-Lee, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 95 days.

(21) Appl. No.: 10/032,922

(22) Filed: Oct. 25, 2001

(65) Prior Publication Data
US 2003/0138606 A1 Jul. 24, 2003

(51) Int. Cl.$^7$ ............................................ B32B 27/14
(52) U.S. Cl. ........................................ 428/195; 503/227
(58) Field of Search .............................. 428/195, 328, 428/32.81; 503/227; 430/227, 945, 200, 201, 202, 270.18; 8/659

(56) References Cited

U.S. PATENT DOCUMENTS

| 4,621,271 A | 11/1986 | Brownstein ............. 346/76 PH |
| 4,950,639 A | 8/1990 | DeBoer et al. ............. 503/227 |
| 5,219,823 A | 6/1993 | Chapman .................... 503/227 |

FOREIGN PATENT DOCUMENTS

| GB | 2 083 726 A | 3/1982 |

*Primary Examiner*—Bruce H. Hess
(74) *Attorney, Agent, or Firm*—Kathleen Neuner Manne

(57) ABSTRACT

A laser-induced thermal recording element comprising a support having thereon a colorant layer comprising a colorant dispersed in a polymeric binder, said colorant layer having associated therewith a laser light-absorbing dye absorbing at the wavelength of a laser used to expose said element, said laser light-absorbing dye comprising a polymethine (cyanine) dye having covalently bonded thereto a phenylenediamine moiety. The element exhibits improved dye stability.

21 Claims, No Drawings

LASER THERMAL IMAGING PROCESS, DYE, AND ELEMENT

FIELD OF THE INVENTION

This invention relates to the use of IR-absorbing dyes for laser imaging, and more particularly to the field of laser thermal dye transfer imaging.

BACKGROUND OF THE INVENTION

In recent years, thermal transfer systems have been developed to obtain prints from pictures that have been generated electronically from a color video camera. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye-donor element is placed face-to-face with a dye-receiving element. The two are then inserted between a thermal printing head and a platen roller. A thermal printing head is used to apply heat from the back of the dye-donor sheet. The thermal printing head has many heating elements and is heated up sequentially in response to one of the cyan, magenta or yellow signals. The process is then repeated for the other two colors. A color hard copy is thus obtained which corresponds to the original picture viewed on a screen. Further details of this process and an apparatus for carrying it out are contained in U.S. Pat. No. 4,621,271, the disclosure of which is hereby incorporated by reference.

Another way to thermally obtain a print using the electronic signals described above is to use a laser instead of a thermal printing head. In such a system, the donor sheet includes a material that strongly absorbs at the wavelength of the laser. When the donor is irradiated, this absorbing material converts light energy to thermal energy and transfers the heat to the dye in the immediate vicinity, thereby heating the dye to its vaporization temperature for transfer to the receiver. The absorbing material may be present in a layer beneath the dye and/or it may be admixed with the dye. The laser beam is modulated by electronic signals which are representative of the shape and color of the original image, so that each dye is heated to cause volatilization only in those areas in which its presence is required on the receiver to reconstruct the color of the original object. Further details of this process are found in GB 2,083,726A, the disclosure of which is hereby incorporated by reference.

U.S. Pat. No. 5,219,823 relates to the use of stabilizers for polymethine (also known as cyanine) IR dyes in a donor element for thermal dye transfer. However, there is a problem with these stabilizers in that they are not effective as one would like, as will be shown hereafter.

U.S. Pat. No. 4,950,639 relates to infrared-absorbing polymethine dyes in a donor element for thermal dye transfer. However, there is a problem with these dyes in that they are not effective as one would like, as will be shown in the examples hereafter.

It is a problem to be solved to provide a laser-induced thermal recording element, a dye, and a process where the element contains an IR dye exhibiting improved stability.

SUMMARY OF THE INVENTION

The invention provides a laser-induced thermal recording element comprising a support having thereon a colorant layer comprising a colorant dispersed in a polymeric binder, said colorant layer having associated therewith a laser light-absorbing dye absorbing at the wavelength of a laser used to expose said element, said laser light-absorbing dye comprising a polymethine (cyanine) dye having covalently bonded thereto a phenylenediamine moiety.

Other embodiments of the invention relate to the IR dye itself and to a process of forming a laser-induced thermal dye transfer image. Embodiments of the invention exhibit improved stability.

DETAILED DESCRIPTION OF THE INVENTION

The laser light-absorbing dye comprising a polymethine or cyanine dye described in this invention has the following formula:

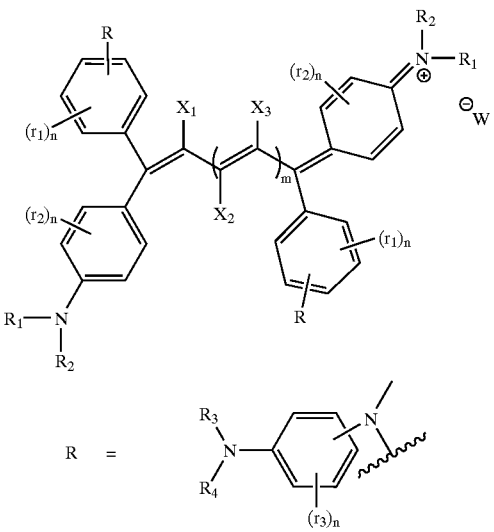

wherein:

$X_1$, $X_2$ and $X_3$ each independently represents hydrogen, halogen, cyano, an alkyl group having 1 to 12 carbon atoms, a cycloalkyl group having 5 to 10 carbon atoms in the carbocyclic ring, an aryl group having 6 to 10 carbon atoms in the carbocyclic ring, or any two of said $X_1$, $X_2$, and $X_3$ may be joined together to complete a 5- to 7-membered carbocyclic or heterocyclic ring group, and m is 1–3;

each R independently represents hydrogen or a substituent with at least one such group being a phenylenediamine moiety group, where each of $R_1$, $R_2$, $R_3$, $R_4$, and $R_5$, independently represents an alkyl group having 1 to 12 carbon atoms a cycloalkyl group having 5 to 10 carbon atoms in the carbocyclic ring, an aryl group having 6 to 10 carbon atoms in the carbocyclic ring, or a heterocyclic or polymeric backbone group; provided $R_1$ and $R_2$ or $R_3$ and $R_4$ may be joined together to form a 5- to 7-membered heterocyclic ring group and;

each of $r_1$, $r_2$, and $r_3$ independently represents a substituent group and each n is 0–4; and W is a monovalent counter anion to balance the charge on the dye.

In a preferred embodiment of the invention, the laser light-absorbing dye comprising a polymethine dye described in this invention has m=1. Suitably, the dye has the following formula:

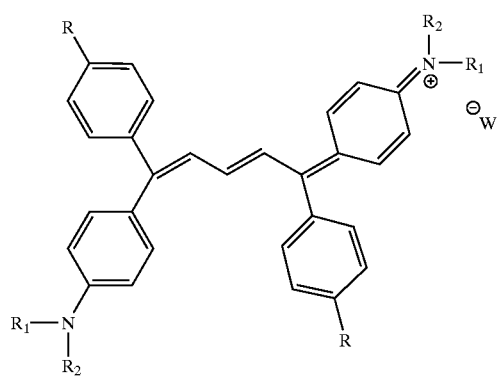

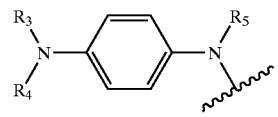

The phenylenediamine moiety "R" in the light-absorbing dye acts as a stabilizer.

Examples of laser light-absorbing dyes within the above formula the following:

| Dye | $R_1$ | $R_2$ | $R_3$ | $R_4$ | $R_5$ |
|-----|-------|-------|-------|-------|-------|
| 1 | Me | Me | Me | Me | Me |
| 2 | Me | n-Butyl | Me | Me | Me |
| 3 | Me | Phenyl | Ethyl | Ethyl | Ethyl |
| 4 | Butyl | Butyl | Methyl | Methyl | Methyl |
| 5 | Phenyl | Phenyl | Methyl | Methyl | Methyl |
| 6 | Butyl | Butyl | Methyl | Phenyl | Methyl |
| 7 | $C_2H_4OH$ | Butyl | Phenyl | Methyl | Methyl |
| 8 | $C_2H_4OH$ | $C_2H_4OH$ | Methyl | Phenyl | Methyl |
| 9 | 4-pyridyl | Butyl | Butyl | 4-pyridyl | butyl |

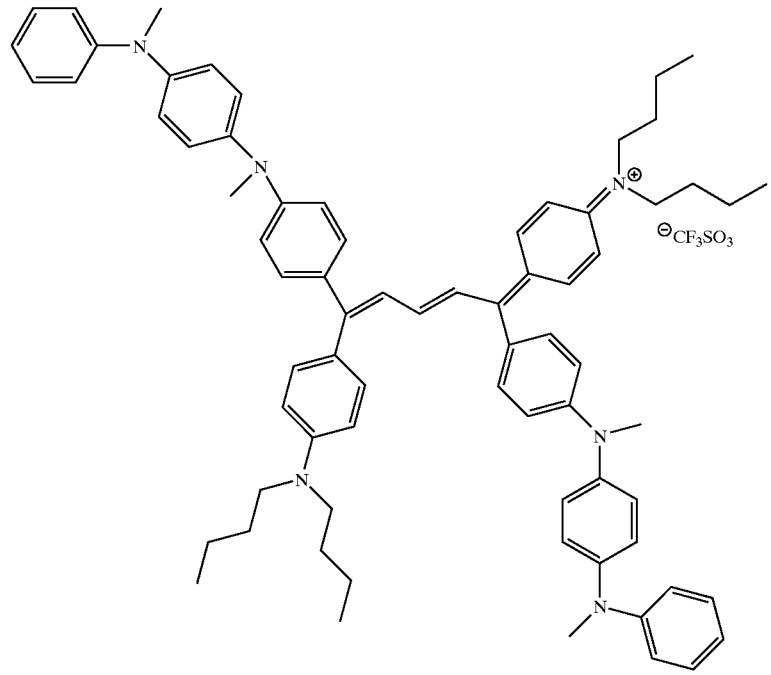

10

-continued
| Dye | R₁ | R₂ | R₃ | R₄ | R₅ |
| --- | --- | --- | --- | --- | --- |
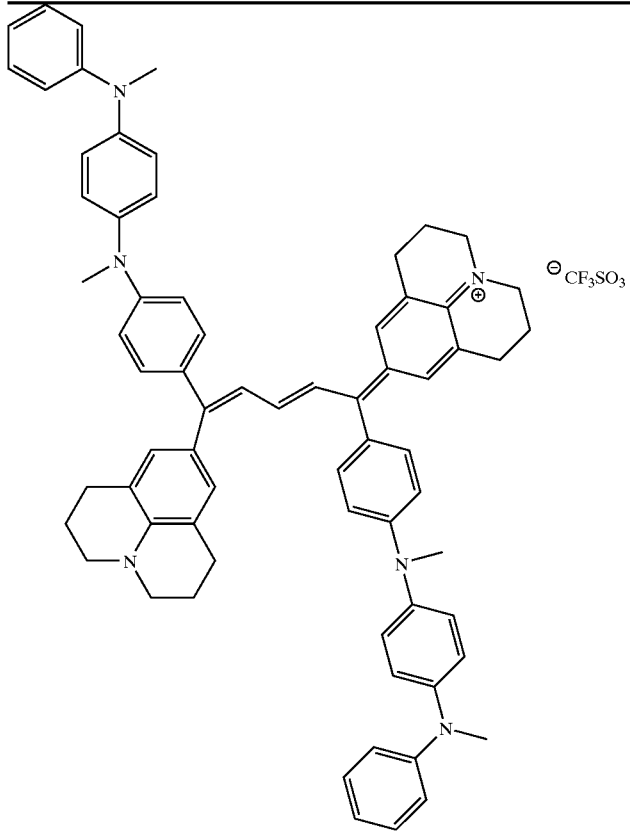
11
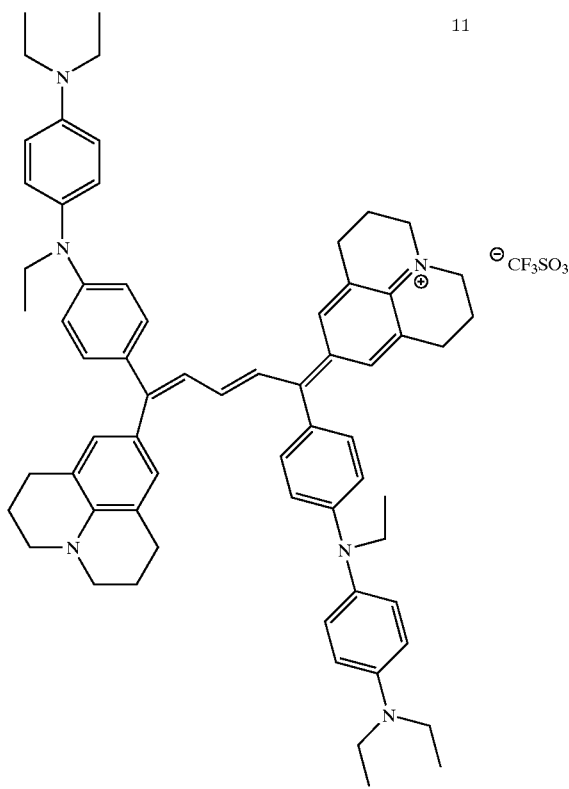
12

In a preferred embodiment of the invention, the amount of the laser light-absorbing dye can be, for example, from about 0.01 g/m$^2$ to about 0.500 g/m$^2$. In another preferred embodiment, the dye layer also has associated therewith an image dye or pigment.

The dye layer of the recording element of the invention may also contain an ultraviolet-absorbing dye, such as a benzotriazole, a substituted dicyanobutadiene, an aminodicyanobutadiene, or any of those materials disclosed in Patent Publications JP 58/62651; JP 57/38896; JP 57/132154; JP 61/109049; JP 58/17450; or DE 3,139,156, the disclosures of which are hereby incorporated by reference. They may be used in an amount of from about 0.05 to about 1.0 g/m$^2$.

Any polymeric material may be used as the binder in the recording element employed in the invention. For example, there may be used cellulosic derivatives, e.g., cellulose nitrate, cellulose acetate hydrogen phthalate, cellulose acetate, cellulose acetate propionate, cellulose acetate butyrate, cellulose triacetate, a hydroxypropyl cellulose ether, an ethyl cellulose ether, etc., polycarbonates; polyurethanes; polyesters; poly(vinyl acetate); polystyrene; poly (styrene-co-acrylonitrile); a polysulfone; a poly(phenylene oxide); a poly(ethylene oxide); a poly(vinyl alcohol-co-acetal) such as poly(vinyl acetal), poly(vinyl alcohol-co-butyral) or poly(vinyl benzal); or mixtures or copolymers thereof. The binder may typically be used at a coverage of from about 0.1 to about 5 g/m$^2$.

In a preferred embodiment, the polymeric binder used in the recording element of the invention has a polystyrene equivalent molecular weight of at least 100,000 as measured by size exclusion chromatography, as described in U.S. Pat. No. 5,330,876, the disclosure of which is hereby incorporated by reference.

A barrier layer may be employed in the laser recording element of the invention if desired, as described in U.S. Pat. No. 5,459,017.

To obtain a laser-induced, dye image according to the invention, an infrared diode laser is preferably employed since it offers substantial advantages in terms of its small size, low cost, stability, reliability, ruggedness, and ease of modulation.

The laser radiation is then absorbed into the dye layer and converted to heat by a molecular process known as internal conversion. Thus, the construction of a useful dye layer will depend not only on the hue, transferability and intensity of any image dye, but also on the ability of the dye layer to absorb the radiation and convert it to heat. As used herein, an infrared-absorbing dye has substantial light absorbtivity in the range between about 700 nm and about 1200 nm. In one embodiment of the invention, the laser exposure in the process of the invention takes place through the dye side of an ablative recording element, which enables this process to be a single-sheet process, i.e., no separate receiving element is required.

Lasers which can be used in the invention are available commercially. There can be employed, for example, Laser Model SDL-2420-H2 from Spectra Diode Labs, or Laser Model SLD 304 V/W from Sony Corp.

The dye layer of the recording element of the invention may be coated on the support or printed thereon by a printing technique such as a gravure process.

Any material can be used as the support for the recording element of the invention provided it is dimensionally stable and can withstand the heat of the laser. Such materials include polyesters such as poly(ethylene naphthalate); polysulfones; poly(ethylene terephthalate); polyamides; polycarbonates; cellulose esters such as cellulose acetate; fluorine polymers such as poly(vinylidene fluoride) or poly (tetrafluoroethylene-co-hexafluoropropylene); polyethers such as polyoxymethylene; polyacetals; polyolefins such as polystyrene, polyethylene, polypropylene or methylpentene polymers; and polyimides such as polyimide-amides and polyether-imides. The support generally has a thickness of from about 5 to about 200 $\mu$m. In a preferred embodiment, the support is transparent.

A thermal printer which uses a laser as described above to form an image on a thermal print medium is described and claimed in U.S. Pat. No. 5,168,288.

Image dyes useful in one embodiment of the invention include any of the dyes disclosed in U.S. Pat. Nos. 4,541,830; 4,698,651; 4,695,287; 4,701,439; 4,757,046; 4,743,582; 4,769,360; and 4,753,922. The above dyes may be employed singly or in combination with other dyes. The dyes may suitably be used at a coverage of from about 0.05 to about 1 g/m$^2$ and are preferably hydrophobic.

Unless otherwise specifically stated, use of the term "group", "substituted" or "substituent" means any group or atom other than hydrogen. Additionally, when the term "group" is used, it means that when a substituent group contains a substitutable hydrogen, it is also intended to encompass not only the substituent's unsubstituted form, but also its form further substituted with any substituent group or groups as herein mentioned, so long as the substituent does not destroy properties necessary for photographic utility. Suitably, a substituent group may be halogen or may be bonded to the remainder of the molecule by an atom of carbon, silicon, oxygen, nitrogen, phosphorous, or sulfur. The substituent may be, for example, halogen, such as chlorine, bromine or fluorine; nitro; hydroxyl; cyano; carboxyl; or groups which may be further substituted, such as alkyl, including straight or branched chain or cyclic alkyl, such as methyl, trifluoromethyl, ethyl, t-butyl, 3-(2,4-di-t-pentylphenoxy) propyl, cyclohexyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2,4-di-t-pentylphenoxy) ethoxy, and 2-dodecyloxyethoxy; aryl such as phenyl, 4-t-butylphenyl, 2,4,6-trimethylphenyl, naphthyl; aryloxy, such as phenoxy, 2-methylphenoxy, alpha- or beta-naphthyloxy, and 4-tolyloxy; carbonamido, such as acetamido, benzamido, butyramido, tetradecanamido, alpha-(2,4-di-t-pentyl-phenoxy)acetamido, alpha-(2,4-di-t-pentylphenoxy) butyramido, alpha-(3-pentadecylphenoxy)-hexanamido, alpha-(4-hydroxy-3-t-butylphenoxy)-tetradecanamido, 2-oxo-pyrrolidin-1-yl, 2-oxo-5-tetradecylpyrrolin-1-yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl) carbonylamino, p-dodecyl-phenylcarbonylamino, p-tolylcarbonylamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-tolylureido, N-(m-hexadecylphenyl)ureido, N,N-(2,5-di-t-pentylphenyl)-N'-ethylureido, and t-butylcarbonamido; sulfonamido, such as methylsulfonamido, benzenesulfonamido, p-tolylsulfonamido, p-dodecylbenzenesulfonamido, N-methyltetradecylsulfonamido, N,N-dipropylsulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl; N-[3-(dodecyloxy)propyl]sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy)acetyl, phenoxycarbonyl, p-dodecyloxyphenoxycarbonyl methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-tolylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-tolylsulfinyl; thio, such as ethylthio, octylthio, benzylthio, tetradecylthio, 2-(2,4-di-t-pentylphenoxy)ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amine, such as phenylanilino, 2-chloroanilino, diethylamine, dodecylamine; imino, such as 1 (N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group or a heterocyclic thio group, each of which may be substituted and which contain a 3 to 7 membered heterocyclic ring composed of carbon atoms and at least one hetero atom selected from the group consisting of oxygen, nitrogen and sulfur, such as 2-furyl, 2-thienyl, 2-benzimidazolyloxy or 2-benzothiazolyl; quaternary ammonium, such as triethylammonium; and silyloxy, such as trimethylsilyloxy.

If desired, the substituents may themselves be further substituted one or more times with the described substituent groups. The particular substituents used may be selected by those skilled in the art to attain the desired photographic properties for a specific application and can include, for example, hydrophobic groups, solubilizing groups, blocking groups, and releasing or releasable groups. When a molecule may have two or more substituents, the substituents may be joined together to form a ring such as a fused ring unless otherwise provided. Generally, the above groups and substituents thereof may include those having up to 48 carbon atoms, typically 1 to 36 carbon atoms and usually less than 24 carbon atoms, but greater numbers are possible depending on the particular substituents selected.

The following examples are provided to illustrate the invention.

EXAMPLES

IR dye samples listed below are used as control compounds in order to demonstrate the advantage of the present invention and are either (a) without a phenylenediamine stabilizer moiety directly attached or (b) with a phenylenediamine moiety used as an external additive, as indicated:

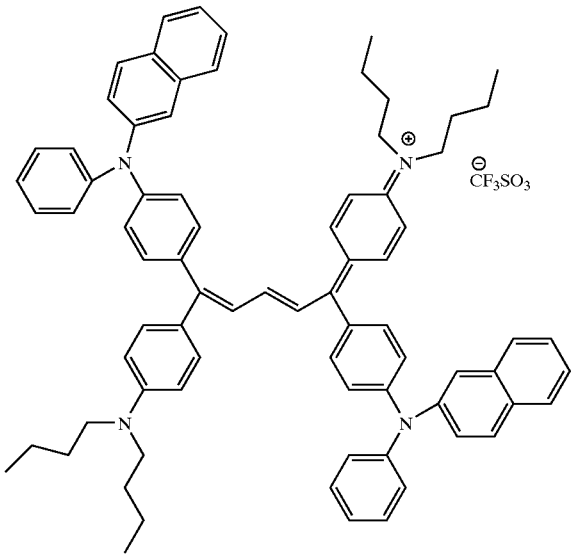

U.S. Pat. No. 4,950,639

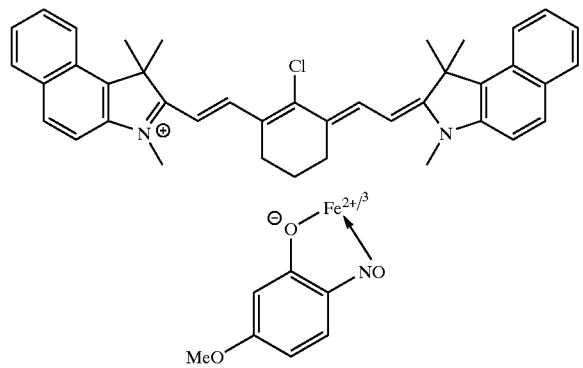

U.S. Pat. No. 5,219,823

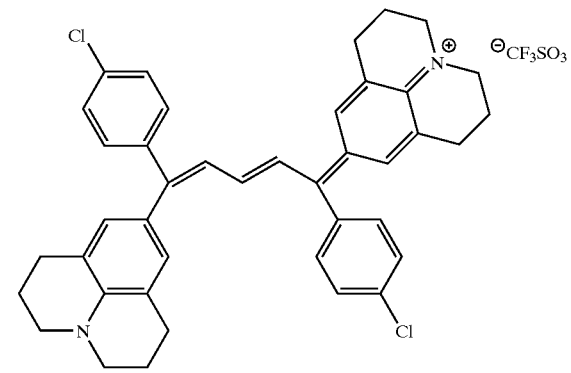

C-4

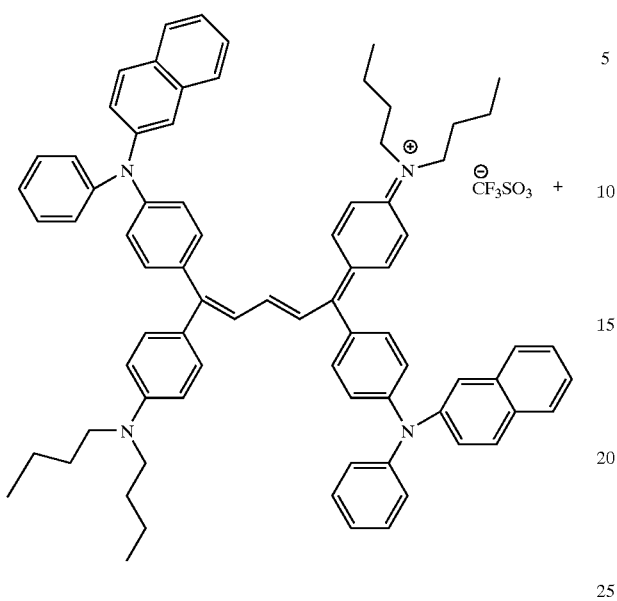

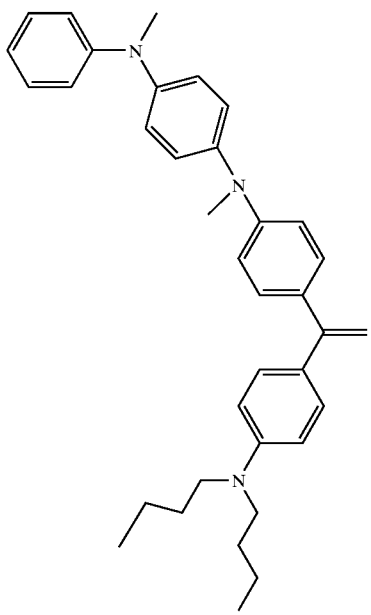

C-5

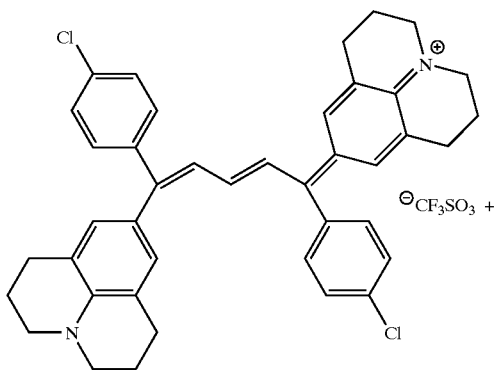

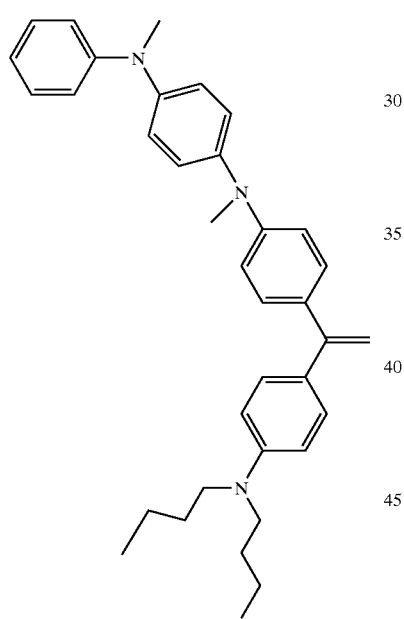

Example 1

Light Stability

Element 1 of the Invention

This element was prepared by coating on a poly(ethyleneterephthalate) support Dye 10 above at 0.1 g/m² in a cellulose acetate propionate binder at 0.5 g/m². The solvent used for the coating was a 70/30 v/v mixture of methyl isobutyl ketone and 3A alcohol.

Control Element CE-1

This element was the same as Element 1 except that dye 10 was replaced with dye sample C-1.

Control Element CE-2

This element was the same as Element 1 except that dye 10 was replaced with dye sample C-2.

The above elements were placed into a light exposure apparatus for 1 week at 5.4 klux and at 50 klux. The spectral absorbance curves before and after the exposure were measured in a spectrophotometer and the stability was calculated based on the percentage density loss of the element at λmax for the highest density step. The following results were obtained:

TABLE 1

| IR Dye Sample | λmax (nm) | 5.4 klux daylight one week | | | 50 klux daylight one week | | |
|---|---|---|---|---|---|---|---|
| | | Density at λmax before | Density at λmax after | % IR Dye Density Loss | Density at λmax before | Density at λmax after | % IR Dye Density Loss |
| C-1 | 848 | 0.93 | 0.59 | 37 | 0.90 | 0.00 | 100* |
| C-2 | 832 | 0.90 | 0.73 | 19 | 0.90 | 0.33 | 63.3 |
| 10 | 836 | 0.82 | 0.81 | 1 | 0.80 | 0.66 | 17.5 |

*The density of the IR dye was completely gone in one day.

The above results show that the IR dye 10 employed in this invention, which has covalently linked phenylenediamine units, exhibits a great stabilization effect in protecting IR dyes from photodecomposition under both light conditions, as compared with prior art control compounds C-1 and C-2.

Example 2

Dark Stability

Example 1 was repeated except that the elements were placed into a black box with constant dry air flow for a period of 6 weeks. The following results were obtained:

TABLE 2

| | | Dark Stability | | |
|---|---|---|---|---|
| IR Dye Sample | λmax (nm) | Density at λmax before | Density at λmax after | % IR Dye Density Loss |
| C-1 | 848 | 0.90 | 0.80 | 11.1 |
| C-2 | 832 | 0.91 | 0.61 | 33.0 |
| 10 | 836 | 0.80 | 0.73 | 8.8 |

The above results show that the IR dye 10 used in this invention, which has covalently linked phenylenediamine units, also exhibit a stabilization effect in protecting IR dyes from air oxidation under dark conditions.

Example 3

Light Stability
Control Element CE-4

This element was the same as Element 1 except that dye 10 was replaced with dye C-4. Example 1 was repeated except that the elements were placed under fluorescent room light conditions for a period of 6 weeks.

This example shows a comparative stability study between the IR dye 10, with covalently-linked phenylenediamine moieties in this invention, and C-4 which contains a mixture of an IR dye and two equivalents of a separate phenylenediamine derivative as an external stabilizer. The following results were obtained:

TABLE 3

| | | Room Light six weeks | | |
|---|---|---|---|---|
| IR Dye Sample | λmax (nm) | Density at λmax before | Density at λmax after | % IR Loss |
| C-4 | 856 | 0.66 | 0.55 | 16.7 |
| 10 | 836 | 0.80 | 0.70 | 12.5 |

This example shows that IR dye stability under room light conditions is improved when the phenylenediamine is covalently attached as in inventive dye 10.

Example 4

Wet-Oven Stability

Example 3 was repeated except that the elements were placed in a wet-oven chamber (38° C./90 RH) for four weeks.

The following results were obtained:

TABLE 4

| | | Wet-oven (38° C./90 RH) four weeks | | |
|---|---|---|---|---|
| IR Dye Sample | λmax (nm) | Density at λmax before | Density at λmax after | % IR Dye Density Loss |
| C-4 | 856 | 0.68 | 0.33 | 51.5 |
| 10 | 836 | 0.80 | 0.78 | 2.5 |

This example shows that IR dye stability in high humidity conditions is improved when the phenylene diamine is covalently attached as in inventive dye 10.

Example 5

Element 2 of the invention was prepared to be the same as Element 1 except that dye 10 was replaced with dye 11. Element 3 of the invention was prepared to be the same as Element 1 except that dye 10 was replaced with dye 12. Control Element CE-3 was prepared to be the same as Element 1 except that dye 10 was replaced with sample C-3. Control Element CE-5 was prepared to be the same as Element 1 except that dye 10 was replaced with sample C-5 (C-3+separate stabilizer).

Example 3 was repeated except that the elements above were placed under room light conditions for a period of 3 weeks.

The following results were obtained:

TABLE 5

| | | Room Light 3 weeks | | |
|---|---|---|---|---|
| IR Dye Sample | λmax (nm) | Density at λmax before | Density at λmax after | % IR Dye Density Loss |
| C-3 | 900 | 0.73 | 0.30 | 58.9 |
| C-5 | 900 | 0.75 | 0.49 | 34.7 |
| 11 | 862 | 0.65 | 0.51 | 21.5 |
| 12 | 869 | 0.50 | 0.41 | 18.0 |

This example shows another comparative stability study between dyes (IR dyes 11 and 12) with covalently 4 inked phenylenediamine moieties claimed in this invention and IR dyes samples (C-3 and C-5) either with or without externally added a phenylenediamine derivatives as stabilizer.

The advantage of covalent attachment of the stabilizers to an IR dye is apparent from the data. Examples for elements 11 and 12 improve light stability significantly. The choice of substituents of the phenylenediamine doesn't seem to matter to their stabilizing effects as the stability of both elements 11 and 12 are very similar under this condition.

Example 6

Example 5 was repeated except that the elements were placed in a wet-oven chamber (38° C./90 RH) for three weeks. The following results were obtained:

TABLE 6

| | | Wet-oven (38° C./90 RH) 3 weeks | | |
|---|---|---|---|---|
| IR Dye | λmax (nm) | Density at λmax before | Density at λmax after | % IR Dye Density Loss |
| C-3 | 900 | 0.72 | 0.17 | 76.3 |
| C-5 | 900 | 0.69 | 0.37 | 46.4 |
| 11 | 862 | 0.67 | 0.65 | 3.0 |
| 12 | 869 | 0.49 | 0.48 | 2.0 |

This example shows that the stability of the inventive dyes useful in the invention in high humidity conditions is much improved when the phenylene diamine is covalently attached.

The invention has been described in detail with particular reference to preferred embodiments thereof, but it will be understood that variations and modifications can be effected within the spirit and scope of the invention. The entire contents of the patents and other publications referred to in this specification are incorporated herein by reference.

What is claimed is:

1. A laser-induced thermal transfer recording element comprising a support having thereon a colorant layer comprising a laser light-absorbing dye absorbing at the wavelength of a laser used to expose said element, and a colorant dispersed in a polymeric binder, said laser light absorbing dye comprising a polymethine dye having covalently bonded thereto a phenylenediamine moiety.

2. The element of claim 1 wherein said colorant layer contains an image dye or pigment.

3. The element of claim 1 wherein said laser light-absorbing dye is present in an amount of from about 0.01 g/m² to about 0.500 g/m² of said element.

4. The element of claim 1 wherein the phenylenediamine moiety comprises a para-phenylenediamine group.

5. The element of claim 1 wherein the phenylenediamine moiety contains an alkyl or phenyl substituent group.

6. The element of claim 1 wherein the dye contains at least two of said phenylenediamine moiety.

7. The element of claim 1 wherein the phenylenediamine moiety is conjugated to a chromophore of the polymethine dye.

8. The element of claim 1 wherein said laser light-absorbing dye has the formula:

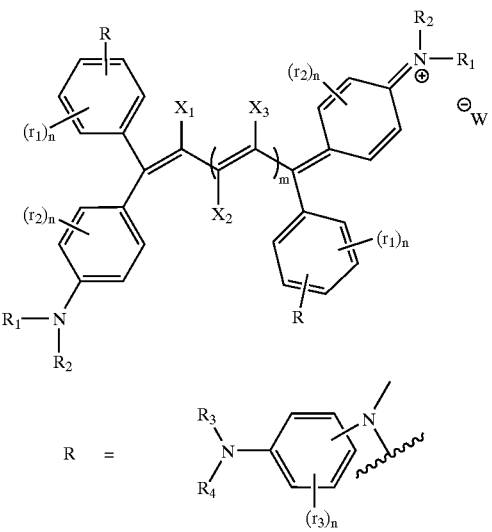

wherein:

$X_1$, $X_2$ and $X_3$ each independently represents hydrogen, halogen, cyano, an alkyl group having 1 to 12 carbon atoms, a cycloalkyl group having 5 to 10 carbon atoms in the carbocyclic ring, an aryl group having 6 to 10 carbon atoms in the carbocyclic ring, or any two of said $X_1$, $X_2$, and $X_3$ may be joined together to complete a 5- to 7-membered carbocyclic or heterocyclic ring group, and m is 1–3;

each R independently represents hydrogen or a substituent with at least one such group being a phenylenediamine moiety group, where each of $R_1$, $R_2$, $R_3$, $R_4$, and $R_5$ independently represents an alkyl group having 1 to 12 carbon atoms a cycloalkyl group having 5 to 10 carbon atoms in the carbocyclic ring, an aryl group having 6 to 10 carbon atoms in the carbocyclic ring, or a heterocyclic or polymeric backbone group; provided $R_1$ and $R_2$ or $R_3$ and $R_4$ may be joined together to form a 5- to 7-membered heterocyclic ring group and;

each of $r_1$, $r_2$, and $r_3$ independently represents a substituent group and each n is 0–4; and W is a monovalent counter anion to balance the charge on the dye.

9. The element of claim 8 wherein both R groups are phenylenediamine groups.

10. The element of claim 9 wherein the alkyl group having 1 to 12 carbon atoms that may represent each of $R_1$, $R_2$, $R_3$, $R_4$, and $R_5$ is independently selected from methyl, ethyl, n-propyl, butyl, and methoxymethyl.

11. The element of claim 9 wherein the aryl group having 6 to 10 carbon atoms in the carbocyclic ring that may represent $R_1$, $R_2$, $R_3$, $R_4$, or $R_5$ is a phenyl or naphthyl group.

12. The element of claim 11 wherein $R_1=R_2$=n-Butyl, $R_3$=Methyl, $R_4$=Phenyl, and $R_5$=Methyl.

13. The element of claim 11 wherein said $R_1=R_2$=—(CH$_2$CH$_2$CH$_2$)—as a part of two fused six-membered rings, $R_3$=Methyl, $R_4$=Phenyl, and $R_5$=Methyl.

14. The element of claim 11 wherein said $R_1=R_2$=—(CH$_2$CH$_2$CH$_2$)—as a part of two fused six-membered rings, and $R_3=R_4=R_5$=Ethyl.

15. The element of claim 8 wherein m is 1.

16. The element of claim 8 wherein m is 2.

17. The element of claim 8 wherein the counter anion is selected from the group consisting of halide, sulfonate, trifluoromethanesulfonate, carboxylate, hydroxide, $SbF_6$, $BF_4$, perchlorate, and phenolate groups.

18. The element of claim 8 wherein each dye substituent group is an alkyl or aryl group.

19. The element of claim 1 wherein the laser light-absorbing dye is a carbocyanine dye.

20. A process of forming a color, laser-induced thermal transfer images, comprising:

a) contacting a dye-receiving element with a thermal transfer recording element comprising a support having thereon a colorant layer comprising a laser light-absorbing dye absorbing at the wavelength of a laser used to expose said element, and a colorant dispersed in a polymeric binder, said laser light-absorbing dye comprising a polymethine dye having covalently bonded thereto a phenylenediamine moiety group;

b) imagewise-heating said thermal recording element by means of a laser; and c) transferring a colorant image from the thermal recording element to the dye-receiving element to form said color, laser-induced thermal transfer image.

21. An IR dye having the formula:

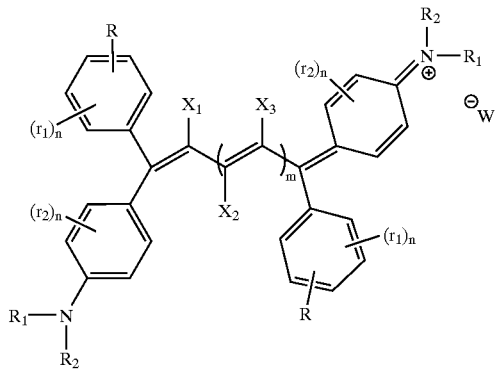

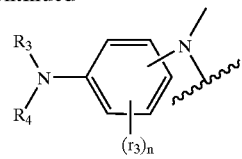

wherein:

$X_1$, $X_2$ and $X_3$ each independently represents hydrogen, halogen, cyano, an alkyl group having 1 to 12 carbon atoms, a cycloalkyl group having 5 to 10 carbon atoms in the carbocyclic ring, an aryl group having 6 to 10 carbon atoms in the carbocyclic ring, or any two of said $X_1$, $X_2$, and $X_3$ may be joined together to complete a 5- to 7-membered carbocyclic or heterocyclic ring group, and m is 1–3;

each R independently represents hydrogen or a substituent with at least one such group being a phenylenediamine moiety group, where each of $R_1$, $R_2$, $R_3$, $R_4$, and $R_5$ independently represents an alkyl group having 1 to 12 carbon atoms, a cycloalkyl group having 5 to 10 carbon atoms in the carbocyclic ring, an aryl group having 6 to 10 carbon atoms in the carbocyclic ring, or a heterocyclic or polymeric backbone group, provided $R_1$ and $R_2$ or $R_3$ and $R_4$ may be joined together to form a 5- to 7-membered heterocyclic ring group;

each of $r_1$, $r_2$, and $r_3$ independently represents a substituent group and each n is 0–4; and W is a monovalent counter anion to balance the charge on the dye.

* * * * *

UNITED STATES PATENT AND TRADEMARK OFFICE
CERTIFICATE OF CORRECTION

PATENT NO. : 6,703,111 B2
DATED : March 9, 2004
INVENTOR(S) : Ruizheng Wang et al.

It is certified that error appears in the above-identified patent and that said Letters Patent is hereby corrected as shown below:

Column 2,
Lines 20-40, delete the following structure, and in place thereof insert the following structure:

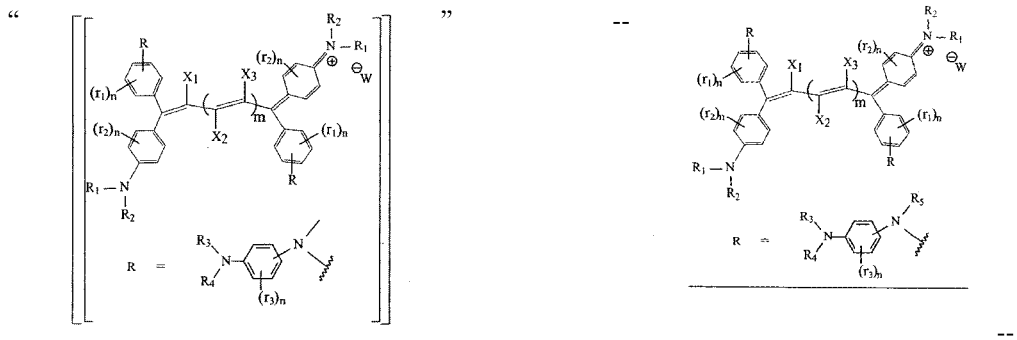

Column 16,
Lines 1-20, delete the following structure, and in place thereof insert the following structure:

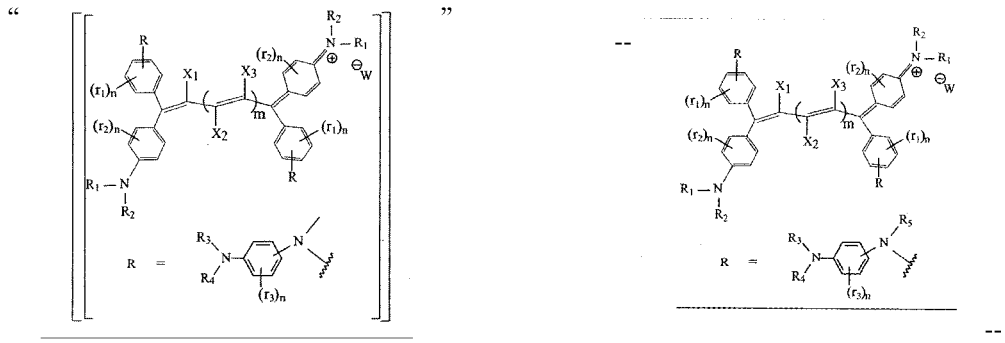

Column 17,
Lines 24-37, delete the following structure, and in place thereof insert the following structure:

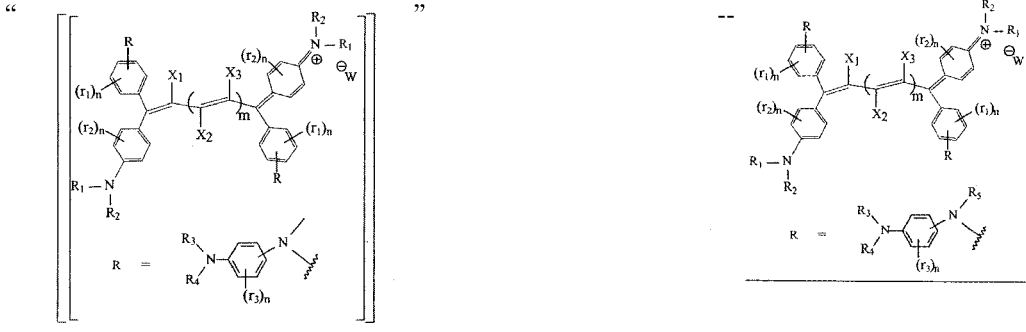

UNITED STATES PATENT AND TRADEMARK OFFICE
CERTIFICATE OF CORRECTION

PATENT NO. : 6,703,111 B2
DATED : March 9, 2004
INVENTOR(S) : Ruizheng Wang et al.

It is certified that error appears in the above-identified patent and that said Letters Patent is hereby corrected as shown below:

Column 18,
Lines 1-7, delete the following structure, and in place thereof insert the following structure:

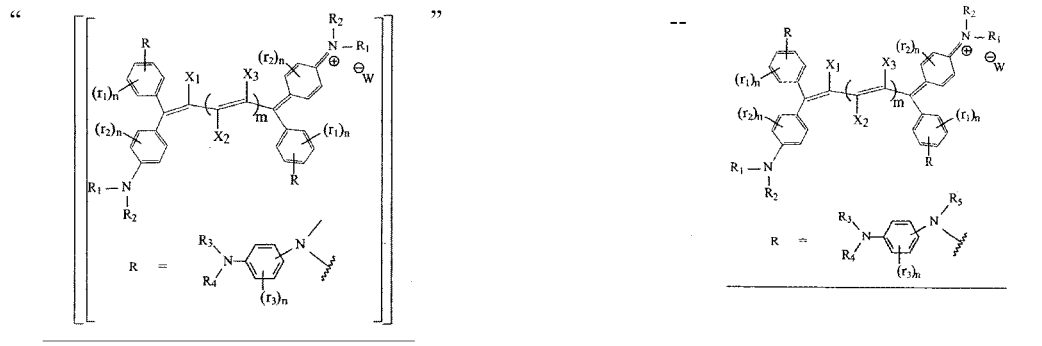

Signed and Sealed this

Twenty-fourth Day of August, 2004

JON W. DUDAS
*Director of the United States Patent and Trademark Office*